March 18, 1930.  F. BEEMER  1,751,453

ANTIFRICTION WHEEL

Filed June 25, 1927

WITNESS:
Rob P Kitchel.

INVENTOR
Frank Beemer
BY
Augustus B Houghton
ATTORNEY.

Patented Mar. 18, 1930

1,751,453

UNITED STATES PATENT OFFICE

FRANK BEEMER, OF PHILADELPHIA, PENNSYLVANIA

ANTIFRICTION WHEEL

Application filed June 25, 1927. Serial No. 201,408.

The principal object of the present invention is to provide antifriction wheels in which the clearance is fixed at the factory and can not be interfered with, in which the parts are so permanently connected together that they can not be disassembled, interfered with or put out of adjustment after leaving the factory, and in which there is provided excellent lubrication and which are strong and adapted for heavy duty or service.

To these and other ends hereinafter set forth the invention may be said to comprise an antifriction wheel including an axle, a hub element of which the parts are nested, an annular groove and a confronting beveled flange providing a conical surface and arranged between the hub parts, roller elements interposed between the hub and axle, and a washer permanently mounted in said groove and overlapping said flange.

The invention also comprises the improvements to be presently described and finally claimed.

In the following description reference will be made to the accompanying drawing forming part hereof and in which Fig. 1 is a central sectional view of a wheel, which happens to be an overhead trolley wheel, embodying features of the invention and showing the dished washer ready for deformation and flattening.

Figure 1:
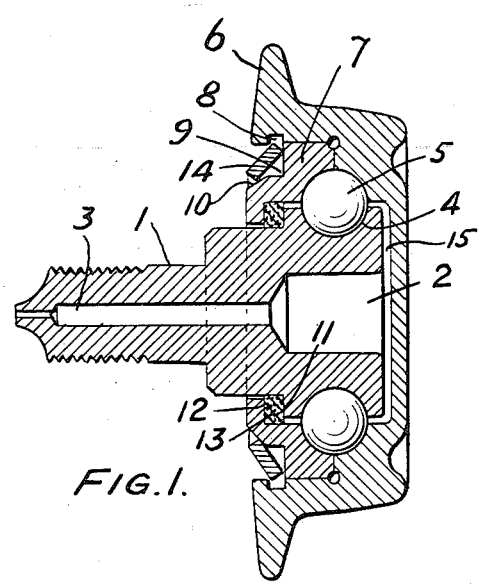

In the drawing 1 is the axle and it is tubular to provide an open ended lubricant receptacle 2 and a passage 3 for the introduction of lubricant. The axle is also provided with a race 4 for the rolling elements 5 shown as balls. The hub element consists of two parts in nested relation. The outer part 6 is of cup shape and the inner part 7 is of ring shape. Between the outer and inner parts 6 and 7 there is an annular groove 8 and a confronting flange 9, and as shown the portion of the ring parts 7 adjacent to the flange 9 is beveled providing a conical face at 10. Between a shoulder 11 on the axle element 1 and a shoulder 12 on the ring part 7 there is a felt dust guard 13.

Figure 2:
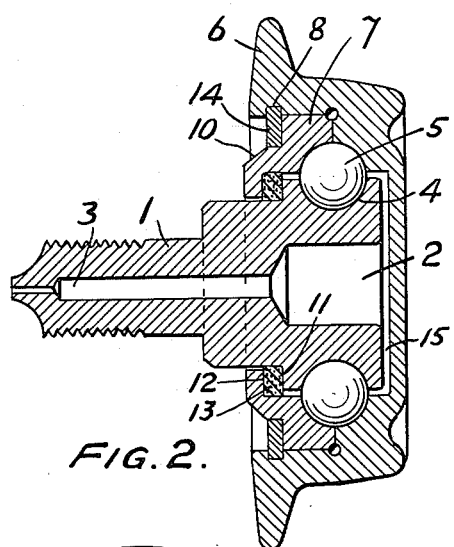
Fig. 2 is a similar view showing the parts in assembled relation.
Figure 4:
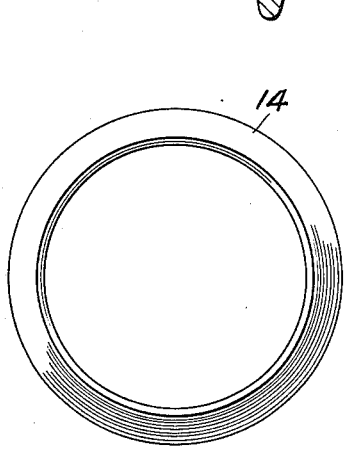
Fig. 4 is a front view of the dished washer.
Figure 3:
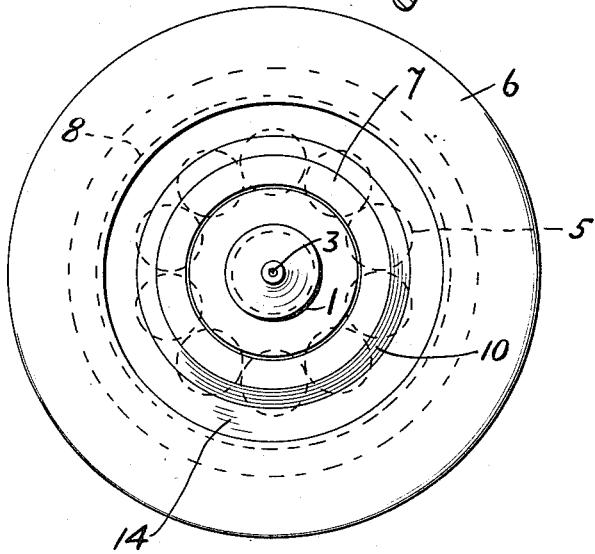
Fig. 3 is an end view looking from left to right in Fig. 2.
Figure 5:
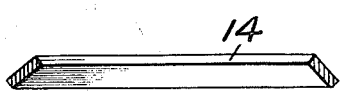
Fig. 5 is a transverse sectional view of the same.

According to my invention when the described parts have been partly assembled as indicated in Fig. 1, the dished washer 14 is arranged as shown with its inner rim on the beveled or conical surface 10 and with its outer rim opposite the annular groove 8 and in abutment with the flange 9. Then, by the application of pressure in any suitable way the washer 14 is deformed and flattened so as to occupy the position shown in Fig. 2, in which it serves to lock permanently the two parts of the hub element together in such a way that they can not be again separated without cutting some of the parts, for example the washer 14. The operation described is a simple one and easily performed and it has the advantage that whatever clearances may have been established are maintained and can not be interfered with. Moreover the wheel as a whole is strong and durable. Good lubrication is provided from the open end of the described receptacle 2 by way of the clearance 15 provided between the axle and hub.

As the dished washer 14 is pressed over the conical surface it is not only flattened but also expanded so that it is permanently mounted in the groove 8, and overlying the face of the flange, permanently secures the two parts of the hub together and also permanently secures the hub in position on the axle through the balls 5 and their races of which one is formed on the axle and of which the other is formed in part on each of the parts of the hub.

It will be obvious to those skilled in the art to which the invention relates that modifications may be made in details of construction and arrangement and in matters of mere form without departing from the spirit of the invention which is not limited to such matters or otherwise than the prior art and the appended claim may require.

I claim:

An antifriction wheel structure including a tubular axle element having a lubricant inlet and chamber and provided externally with a ball groove and with a shoulder, a hub element consisting of an outer portion having a half ball groove and an annular groove and of a ring shaped inner portion having a flange and a conical portion and a shoulder, there being a dust guard between said shoulders and an oil passage between the hub and axle element, balls in said races, and a washer expanded and permanently seated in said annular groove and engaging said flange.

FRANK BEEMER.